US012587625B2

(12) United States Patent
Yoon et al.

(10) Patent No.: US 12,587,625 B2
(45) Date of Patent: Mar. 24, 2026

(54) STEREOSCOPIC IMAGE DISPLAY DEVICE AND CONTROLLING METHOD THEREOF

(71) Applicant: SAMSUNG ELECTRONICS CO., LTD., Suwon-si (KR)

(72) Inventors: Youngjin Yoon, Suwon-si (KR); Narae Choi, Suwon-si (KR); Yeoul Lee, Suwon-si (KR); Jaewoong Soh, Suwon-si (KR); Sungho Lee, Suwon-si (KR); Woongil Choi, Suwon-si (KR); Yelin Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/883,662

(22) Filed: Sep. 12, 2024

(65) Prior Publication Data

US 2025/0240398 A1    Jul. 24, 2025

Related U.S. Application Data

(63) Continuation of application No. PCT/KR2024/096094, filed on Aug. 29, 2024.

(30) Foreign Application Priority Data

Jan. 19, 2024    (KR) ........................ 10-2024-0008933

(51) Int. Cl.
*H04N 13/128* (2018.01)
*G06T 3/18* (2024.01)
(Continued)

(52) U.S. Cl.
CPC ............. *H04N 13/128* (2018.05); *G06T 3/18* (2024.01); *G06T 7/20* (2013.01); *G06T 7/50* (2017.01);
(Continued)

(58) Field of Classification Search
CPC .. H04N 13/128; H04N 13/383; H04N 13/398; G06T 7/50; G06T 7/20; G06T 3/18; G06V 10/25; G06V 10/44
(Continued)

(56) References Cited

U.S. PATENT DOCUMENTS

| | | |
|---|---|---|
| 8,842,167 B2 | 9/2014 | Kang et al. |
| 10,531,066 B2 | 1/2020 | Sun et al. |

(Continued)

FOREIGN PATENT DOCUMENTS

| | | |
|---|---|---|
| CN | 103096125 A | 5/2013 |
| JP | 2004-333661 A | 11/2004 |

(Continued)

OTHER PUBLICATIONS

International Search Report (PCT/ISA/210) dated Dec. 4, 2024, issued by International Searching Authority for International Application No. PCT/KR2024/096094.
(Continued)

*Primary Examiner* — Joseph G Ustaris
(74) *Attorney, Agent, or Firm* — Sughrue Mion, PLLC

(57) ABSTRACT

A stereoscopic image display device includes: a display; at least one processor; and memory storing instructions that, when executed by the at least one processor, cause the at least one processor to: obtain a depth map from a planar image; obtain feature information related to a first depth from the depth map; obtain context information of the planar image; calculate an estimated visual comfort (VC) of a user for viewing a first stereoscopic image, based on the depth map, the feature information, and the context information; generate a corrected depth map, based on the estimated VC and a target VC; generate a left-eye image by correcting the planar image, based on the corrected depth map; generate a right-eye image by warping the left-eye image; and output,
(Continued)

STEREOSCOPIC IMAGE DISPLAY DEVICE ~100

LEFT-EYE IMAGE

RIGHT-EYE IMAGE 210    220 ~200 to the display, the left-eye image and the right-eye image to display a second stereoscopic image.

18 Claims, 11 Drawing Sheets

(51) Int. Cl.

| | |
|---|---|
| *G06T 7/20* | (2017.01) |
| *G06T 7/50* | (2017.01) |
| *G06V 10/25* | (2022.01) |
| *G06V 10/44* | (2022.01) |
| *H04N 13/383* | (2018.01) |
| *H04N 13/398* | (2018.01) |

(52) U.S. Cl.
CPC .............. *G06V 10/25* (2022.01); *G06V 10/44* (2022.01); *H04N 13/383* (2018.05); *H04N 13/398* (2018.05)

(58) Field of Classification Search
USPC ........................................................... 348/51
See application file for complete search history.

(56) References Cited

U.S. PATENT DOCUMENTS

| | | | |
|---|---|---|---|
| 2012/0098823 | A1 | 4/2012 | Hong et al. |
| 2013/0106844 | A1* | 5/2013 | Hong ................... H04N 13/128 |
| | | | 345/419 |
| 2013/0147911 | A1 | 6/2013 | Karsch et al. |
| 2013/0249874 | A1 | 9/2013 | Song et al. |
| 2016/0173851 | A1* | 6/2016 | Kim ..................... H04N 13/128 |
| | | | 382/154 |
| 2020/0064631 | A1 | 2/2020 | Robbins et al. |
| 2021/0012531 | A1* | 1/2021 | Ollila ......................... G06T 7/50 |
| 2024/0394839 | A1* | 11/2024 | Schroers ................... G06T 5/77 |

FOREIGN PATENT DOCUMENTS

| | | | |
|---|---|---|---|
| KR | 10-2012-0041948 A | | 5/2012 |
| KR | 10-2013-0005082 A | | 1/2013 |
| KR | 10-1218723 B1 | | 1/2013 |
| KR | 10-1385480 B1 | | 4/2014 |
| KR | 10-2014-0125109 A | | 10/2014 |
| KR | 10-2015-0038859 A | | 4/2015 |
| KR | 10-1638919 B1 | | 7/2016 |
| KR | 10-1845972 B1 | | 5/2018 |
| KR | 10-2334212 B1 | | 12/2021 |
| WO | 2013/109252 A1 | | 7/2013 |

OTHER PUBLICATIONS

Hak Gu Kim et al., "Visual Comfort Aware-Reinforcement Learning for Depth Adjustment of Stereoscopic 3D Images," arXiv:2104. 06782v1 [cs.CV], Apr. 2021, total 9 pages.
Lei Fan et al., "Eye movement characteristics and visual fatigue assessment of virtual reality games with different interaction modes," Frontiers in Neuroscience, Mar. 2023, total 8 pages.
Seok-Hwa Kim et al., "A Study on Relationship between Near Work and Eye Fatigue," Journal of Digital Convergence, vol. 16. No. 10, pp. 531-536, Oct. 2018.
Yunyang Shi et al., "A visual discomfort recognition model based on the fusion of multisource information," https://doi.org/10.1002/jsid. 1084, Oct. 2021, total 1 page (Abstract).

* cited by examiner

FIG. 3

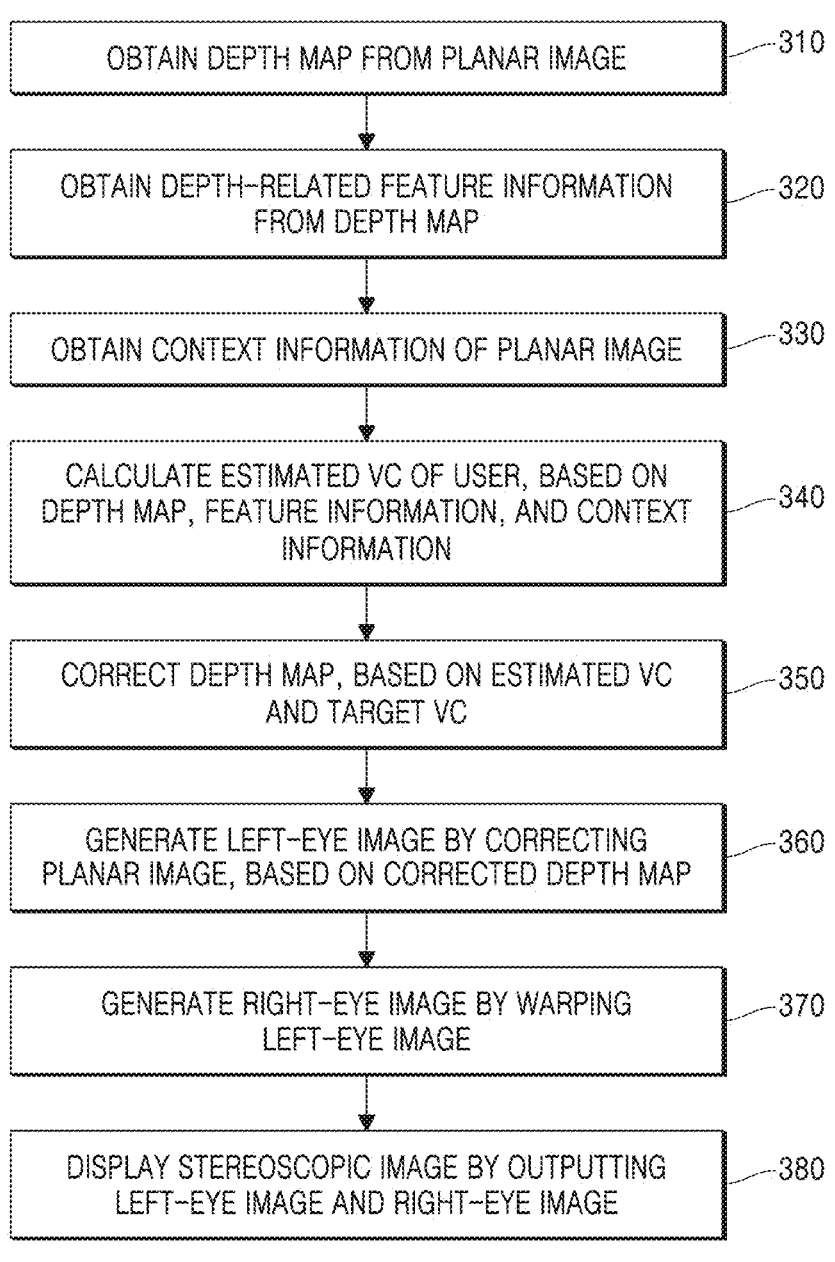

OBTAIN DEPTH MAP FROM PLANAR IMAGE — 310

OBTAIN DEPTH-RELATED FEATURE INFORMATION FROM DEPTH MAP — 320

OBTAIN CONTEXT INFORMATION OF PLANAR IMAGE — 330

CALCULATE ESTIMATED VC OF USER, BASED ON DEPTH MAP, FEATURE INFORMATION, AND CONTEXT INFORMATION — 340

CORRECT DEPTH MAP, BASED ON ESTIMATED VC AND TARGET VC — 350

GENERATE LEFT-EYE IMAGE BY CORRECTING PLANAR IMAGE, BASED ON CORRECTED DEPTH MAP — 360

GENERATE RIGHT-EYE IMAGE BY WARPING LEFT-EYE IMAGE — 370

DISPLAY STEREOSCOPIC IMAGE BY OUTPUTTING LEFT-EYE IMAGE AND RIGHT-EYE IMAGE — 380

FIG. 5

FIG. 7
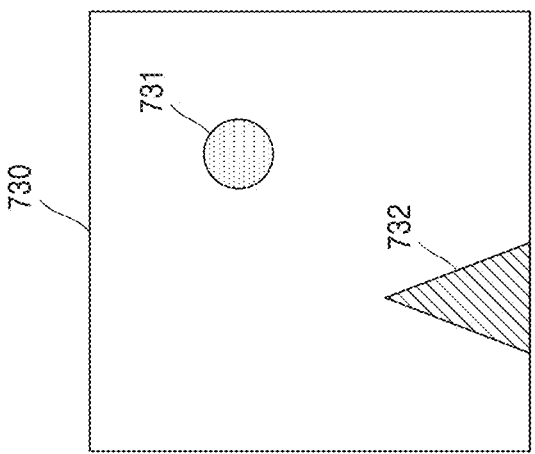
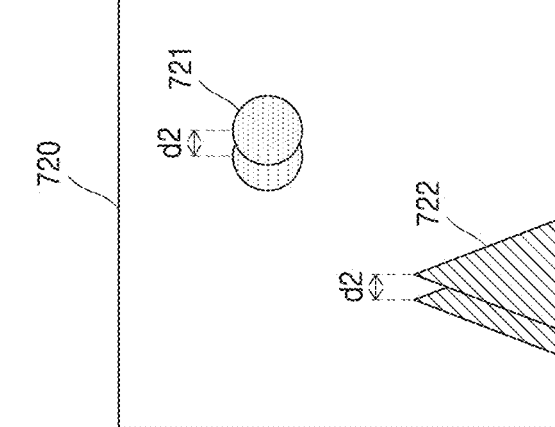
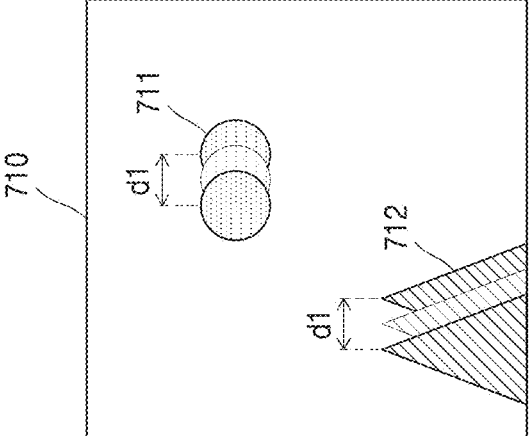

FIG. 9
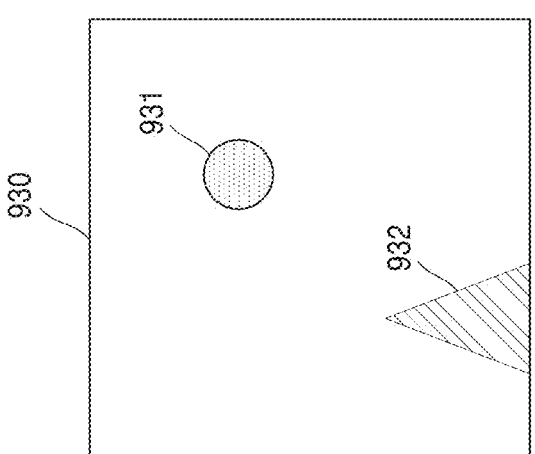
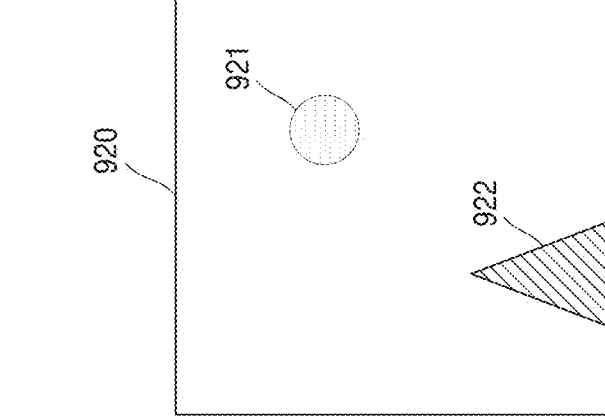
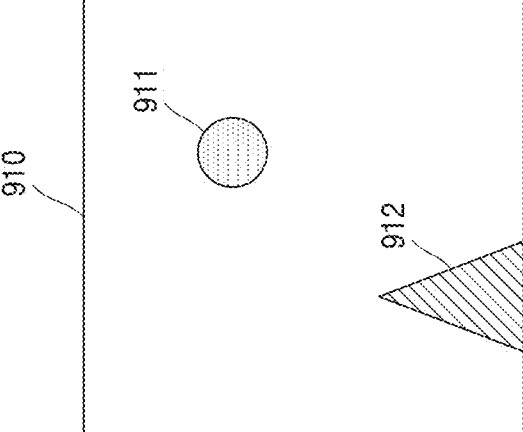

OBTAIN FACE IMAGE — 1110

TRACK USER'S GAZE IN FACE IMAGE — 1120

EXTRACT REGION OF INTEREST FROM PLANAR IMAGE, BASED ON TRACKING RESULT — 1130

OBTAIN DEPTH MAP FROM PLANAR IMAGE — 1140

CORRECT DEPTH MAP, BASED ON TARGET VC — 1150

CORRECT COLOR OF REGION OF INTEREST, BASED ON DEPTH MAP AND REGION OF INTEREST — 1160

DISPLAY STEREOSCOPIC IMAGE, BASED ON CORRECTED REGION OF INTEREST — 1170

1

STEREOSCOPIC IMAGE DISPLAY DEVICE AND CONTROLLING METHOD THEREOF

CROSS-REFERENCE TO RELATED APPLICATIONS

This application is a by-pass continuation application of International Application No. PCT/KR2024/096094, filed on Aug. 29, 2024, which is based on and claims priority to Korean Patent Application No. 10-2024-0008933, filed on Jan. 19, 2024, in the Korean Intellectual Property Office, the disclosures of which are incorporated by reference herein in their entireties.

BACKGROUND

1. Field

The disclosure relates to a stereoscopic image display device and a controlling method thereof.

2. Description of Related Art

A stereoscopic image display device may be a device that converts planar images into stereoscopic images by using binocular parallax and displays the stereoscopic images. Stereoscopic images allow users to feel a three-dimensional effect and may provide a higher sense of immersion to the users than planar images. Stereoscopic image display devices are widely used together with head mounted displays (HMDs), movies, exhibition hall images, and the like.

Stereoscopic images may give users a three-dimensional effect depending on the degree of depth or disparity. As the three-dimensional effect of stereoscopic images increases, users may perceive the depth of the stereoscopic images. Stereoscopic images may have visual comfort (VC) depending on the degree of a three-dimensional effect. As the three-dimensional effect of stereoscopic images increases, the VC may increase. The three-dimensional effect and the VC may have a trade-off relationship.

Existing stereoscopic image display devices estimate the depth of planar images and generate stereoscopic images along a designated reference line, regardless of VC. Accordingly, stereoscopic images displayed on existing stereoscopic image display devices may give users a feeling of visual fatigue.

SUMMARY

According to an aspect of the disclosure, a stereoscopic image display device includes: a display; at least one processor; and memory storing instructions that, when executed by the at least one processor, cause the at least one processor to: obtain a depth map from a planar image; obtain feature information related to a first depth from the depth map; obtain context information of the planar image; calculate an estimated visual comfort (VC) of a user for viewing a first stereoscopic image, based on the depth map, the feature information, and the context information; generate a corrected depth map, based on the estimated VC and a target VC; generate a left-eye image by correcting the planar image, based on the corrected depth map; generate a right-eye image by warping the left-eye image; and output, to the display, the left-eye image and the right-eye image to display a second stereoscopic image.

According to an aspect of the disclosure, a method of controlling a stereoscopic image display device, includes: obtaining a depth map from a planar image; obtaining feature information related to a first depth from the depth map; obtaining context information of the planar image; calculating an estimated visual comfort (VC) of a user for viewing a first stereoscopic image, based on the depth map, the feature information, and the context information; generate a corrected depth map, based on the estimated VC and a target VC; generating a left-eye image by correcting the planar image, based on the corrected depth map; generating a right-eye image by warping the left-eye image; and outputting the left-eye image and the right-eye image to display a second stereoscopic image.

BRIEF DESCRIPTION OF THE DRAWINGS

The above and other aspects, features, and advantages of certain embodiments of the present disclosure are more apparent from the following description taken in conjunction with the accompanying drawings, in which:

FIG. 3 is a flowchart of a method of controlling a stereoscopic image display device according to one or more embodiments.

FIG. 5 is a diagram illustrating an inference module and a target visual comfort (VC) score network of the stereoscopic image display device according to one or more embodiments.

FIG. 7 is a diagram illustrating stereoscopic images the stereoscopic image display device according to one or more embodiments displays by taking into account VC.

FIG. 9 is a diagram illustrating stereoscopic images the stereoscopic image display device according to one or more embodiments displays by taking into account a user's gaze.

DETAILED DESCRIPTION

Figure 1:
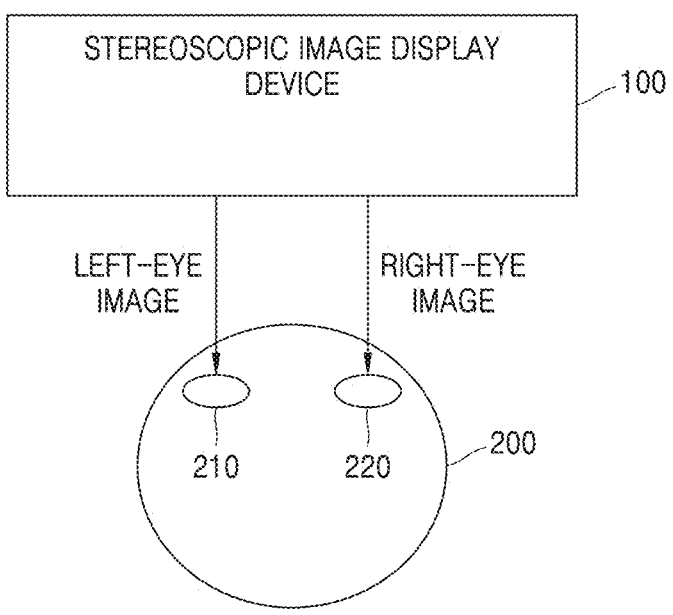
FIG. 1 is a diagram illustrating a stereoscopic image display device according to one or more embodiments.

The embodiments described in the disclosure, and the configurations shown in the drawings, are only examples of embodiments, and various modifications may be made without departing from the scope and spirit of the disclosure.

The terms as used herein are briefly described, and one or more embodiments is described in detail.

As for the terms as used herein, common terms that are currently widely used are selected as much as possible while taking into account functions in one or more embodiments.

However, the terms may vary depending on the intention of those of ordinary skill in the art, precedents, the emergence of new technology, and the like. Also, in a specific case, there are also terms arbitrarily selected by the applicant. In this case, the meaning of the terms will be described in detail in the description of the embodiment. Therefore, the terms as used herein should be defined based on the meaning of the terms and the description throughout the disclosure rather than simply the names of the terms.

Throughout the disclosure, the expression "a portion includes a certain element" means that a portion further includes other elements rather than excludes other elements unless otherwise stated. Also, the terms such as "unit" and "module" as used herein refer to units that process at least one function or operation, and may be implemented as hardware, software, or a combination of hardware and software.

Hereinafter, one or more embodiments will be described in detail with reference to the accompanying drawings, so that those of ordinary skill in the art may implement the embodiments of the disclosure. However, one or more embodiments may be implemented in various different forms and are not limited to the embodiments described herein. To clearly explain one or more embodiments, similar reference numerals are assigned to similar parts throughout the disclosure.

Provided is a technology for generating a stereoscopic image with low visual comfort (VC) through depth adjustment based on a VC estimation model when receiving a planar image and generating a stereoscopic image.

FIG. 1 is a diagram illustrating a stereoscopic image display device 100 according to one or more embodiments.

The stereoscopic image display device 100 may be a device that converts planar images into stereoscopic images by using binocular parallax and displays the stereoscopic images. The stereoscopic image display device 100 may output a left-eye image and a right-eye image to a user 200. The stereoscopic image display device 100 may provide the left-eye image to a left eye 210 of the user 200. The stereoscopic image display device 100 may provide the right-eye image to a right eye 220 of the user 200. The stereoscopic image display device 100 may allow the user 200 to recognize a stereoscopic image according to binocular parallax.

The stereoscopic image allows users to feel a three-dimensional effect and may provide a higher sense of immersion to the users than the planar image. The stereoscopic image may generate a three-dimensional effect due to the difference between the left-eye image and the right-eye image. The stereoscopic image display device 100 may include a head mounted display (HMD), a movie screening device, and an exhibition hall image display device. The stereoscopic image display device 100 may be widely used in situations where a sense of space is to be provided to the user.

Stereoscopic images may give users a three-dimensional effect depending on the degree of depth or disparity. The depth may refer to a depth of an object included in a stereoscopic image. The object may refer to any object other than a background of a stereoscopic image. The disparity may refer to the difference between the left-eye image and the right-eye image. As the three-dimensional effect of stereoscopic images increases, users may perceive the depth of the stereoscopic images. The stereoscopic image may have VC depending on the degree of the three-dimensional effect. The VC may be the fatigue felt by a user who recognizes a stereoscopic image. As the three-dimensional effect of stereoscopic images increases, the VC may increase. The three-dimensional effect and the VC may have a trade-off relationship.

Figure 2:
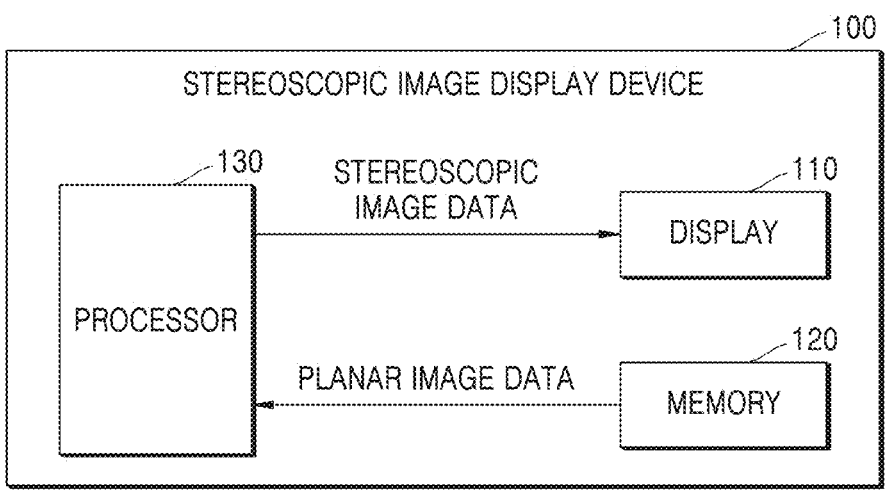
FIG. 2 is a block diagram illustrating the stereoscopic image display device according to one or more embodiments.

FIG. 2 is a block diagram illustrating the stereoscopic image display device 100 according to one or more embodiments. The stereoscopic image display device 100 according to one or more embodiments may include a display 110, a memory 120, and a processor 130.

In one or more embodiments, the display 110 may display a stereoscopic image to the outside of the stereoscopic image display device 100. The display 110 may receive data for displaying the stereoscopic image from the processor 130. The display 110 may display the stereoscopic image by using binocular parallax of the user. The display 110 may output the left-eye image and the right-eye image to allow the user to recognize the stereoscopic image. The display 110 may include a display panel that outputs the left-eye image and the right-eye image, and a display driver integrated circuit (DDI) that drives the display panel. For example, the display 110 may include at least one of a liquid crystal display (LCD), an organic light-emitting display (OLED), a quantum dot (QD) display, or a micro light-emitting diode (LED).

In one or more embodiments, the memory 120 may store at least one instruction. The at least one instruction may control the overall operation of the stereoscopic image display device 100. The memory 120 may store planar image data related to a planar image obtained by the stereoscopic image display device 100. The at least one instruction may cause the processor 130 to generate stereoscopic image data, based on the planar image data. The memory 120 may include at least one type of storage medium selected from flash memory-type memory, hard disk-type memory, multimedia card micro-type memory, card-type memory (for example, secure digital (SD) or extreme digital (XD) memory), random access memory (RAM), static random access memory (SRAM), read-only memory (ROM), electrically erasable programmable read-only memory (EEPROM), programmable read-only memory (PROM), magnetic memory, magnetic disc, and optical disc.

In one or more embodiments, the processor 130 may control the overall operation of the stereoscopic image display device 100. The processor 130 may execute the at least one instruction stored in the memory 120. The at least one instruction, when executed by the processor 130, may cause the processor 130 to generate the stereoscopic image data, based on the planar image data. The processor 130 may receive the planar image data from the memory 120. The processor 130 may generate the stereoscopic image data, based on the planar image data. The processor 130 may transmit the stereoscopic image data to the display 110. The processor 130 may include at least one of a central processing unit (CPU), an application processor (AP), a graphics processing unit (GPU), or an image signal processor (ISP).

In one or more embodiments, the processor 130 may obtain a depth map from the planar image. The depth map may be information indicating the depth of each pixel constituting the planar image. The processor 130 may obtain the depth map by extracting depth information of each pixel constituting the planar image. For example, the processor 130 may obtain the depth map by extracting the depth information from the planar image data stored in the memory 120. For example, the processor 130 may obtain the depth map by extracting depth information through a network that estimates the depth of the planar image.

In one or more embodiments, the processor 130 may obtain depth-related feature information from the depth map. The feature information may include a weighting value that contributes to VC estimation according to the depth of pixels included in the planar image. The feature information may include depth information indicating the depth of each region of the planar image and a confidence value obtained by estimating the error degree of the depth. The feature information may include factors important for VC estimation.

In one or more embodiments, the processor 130 may obtain context information of the planar image. The context information of the planar image may be defined as information indicating features and situations extracted from the planar image. The context information of the planar image may be referred to as feature information of the planar image, a feature value of the planar image, or a feature extraction result of the planar image.

In one or more embodiments, the context information may include an object included in the planar image, a relative size of the object, and a position of the object. The object included in the planar image may refer to any object other than a background of the planar image. The object may refer to an object that has the greatest influence on characteristics of the planar image as a result of measuring saliency. The object may be a feature value represented in the form of a map. The relative size of the object may refer to a ratio of the sizes of the respective objects included in the planar image. The position of the object may be a portion recognized as the most important portion of the object in VC estimation.

In one or more embodiments, the context information may include motion information related to the motion of the planar image and edge information to correct the estimated VC based on an error in a depth of the planar image.

In one or more embodiments, the processor 130 may calculate an estimated VC of the user, based on the depth map, the feature information, and the context information. The estimated VC may represent the VC felt by the user when recognizes the stereoscopic image. For example, the estimated VC of the user may be the level of the VC felt by the user when recognizes the stereoscopic image. The processor 130 may extract factors important for VC estimation from the planar image and the estimated depth. The processor 130 may calculate the estimated VC of the user, based on the extracted factors important for VC estimation. The processor 130 may estimate the level of the VC, based on the weighting value that contributes to VC estimation. The processor 130 may estimate the VC by simultaneously taking into account the importance of the context information of the planar image and the depth of the planar image. Accordingly, the processor 130 may estimate the VC in a manner that is robust to errors that occur when estimating the depth in the planar image.

In one or more embodiments, the processor 130 may correct the depth map, based on the estimated VC and a target VC. The target VC may be a threshold VC determined so that the user does not feel VC higher than the corresponding level. The processor 130 may receive a target VC included in user input. The processor 130 may adjust the three-dimensional effect of the stereoscopic image so that the estimated VC corresponds to the target VC. The processor 130 may correct the depth map to correspond to the adjusted three-dimensional effect.

In one or more embodiments, the processor 130 may generate a left-eye image by correcting the planar image, based on the corrected depth map. The processor 130 may generate, as the left-eye image, a planar image corrected to correspond to the target VC.

In one or more embodiments, the processor 130 may generate a right-eye image by warping the left-eye image. The warping may be a process that manipulates an image so that at least one object included in the image is transformed and displayed. The warping may be used for image processing, image manipulation, or stereoscopic image generation. For example, the warping may include a process of digitally manipulating an image to distort and display at least one object included in a planar image so that the planar image has a three-dimensional effect. For example, the warping may include a process of performing at least one manipulation among X-axis shift, Y-axis shift, X-axis rotation, Y-axis rotation, and scaling on at least one object included in the planar image, to give the at least one object a three-dimensional effect. The processor 130 may generate the right-eye image by warping the left-eye image to correspond to the target VC.

In one or more embodiments, the processor 130 may output the left-eye image and the right-eye image to cause the display 110 to display a stereoscopic image. The processor 130 may control the display 110 so that the left-eye image is directed to the left eye of the user and the right-eye image is directed to the right eye of the user. The processor 130 may control the display 110 to output the left-eye image and the right-eye image to allow the user to recognize the stereoscopic image.

FIG. 3 is a flowchart of a method of controlling the stereoscopic image display device 100 according to one or more embodiments.

In operation 310, the stereoscopic image display device 100 according to one or more embodiments may obtain a depth map from a planar image. The stereoscopic image display device 100 may obtain the depth map by extracting depth information of each pixel constituting the planar image.

In operation 320, the stereoscopic image display device 100 according to one or more embodiments may obtain depth-related feature information from the depth map. The stereoscopic image display device 100 may obtain a weighting value that contributes to VC estimation according to the depth of pixels included in the planar image. The stereoscopic image display device 100 may obtain depth information indicating the depth of each region of the planar image and a confidence value obtained by estimating the error degree of the depth. The stereoscopic image display device 100 may obtain factors important for VC estimation.

In operation 330, the stereoscopic image display device 100 according to one or more embodiments may obtain context information of the planar image. The context information of the planar image may be defined as information indicating features and situations extracted from the planar image. The context information of the planar image may be referred to as feature information of the planar image, a feature value of the planar image, or a feature extraction result of the planar image. The stereoscopic image display device 100 may obtain an object included in the planar image, a relative size of the object, and a positions of the object. The object may refer to an object that has the greatest influence on characteristics of the planar image as a result of measuring saliency. The object may be a feature value represented in the form of a map. The relative size of the object may refer to a ratio of the sizes of the respective objects included in the planar image. The position of the object may be a portion recognized as the most important portion of the object in VC estimation. The stereoscopic image display device 100 may obtain motion information related to the motion of the planar image and edge information to correct the estimated VC based on an error in a depth of the planar image.

In operation 340, the stereoscopic image display device 100 according to one or more embodiments may calculate the estimated VC of the user, based on the depth map, the feature information, and the context information. The stereoscopic image display device 100 may calculate the level of the VC that the user feels when recognizing a stereoscopic image. The stereoscopic image display device 100 may extract factors important for VC estimation from the planar image and the estimated depth. The stereoscopic image display device 100 may calculate the estimated VC of the user, based on the extracted factors important for VC estimation. The stereoscopic image display device 100 may estimate the level of the VC, based on the weighting value that contributes to VC estimation. The stereoscopic image display device 100 may estimate the VC by simultaneously taking into account the importance of the context information of the planar image and the depth of the planar image. Accordingly, the stereoscopic image display device 100 may estimate the VC in a manner that is robust to errors that occur when estimating the depth in the planar image.

In operation 350, the stereoscopic image display device 100 according to one or more embodiments may correct the depth map, based on the estimated VC and the target VC. The stereoscopic image display device 100 may receive, as the target VC, a threshold VC that prevents the user from feeling the VC higher than the corresponding level. The stereoscopic image display device 100 may adjust the three-dimensional effect of the stereoscopic image so that the estimated VC corresponds to the target VC. The stereoscopic image display device 100 may correct the depth map to correspond to the adjusted three-dimensional effect.

In operation 360, the stereoscopic image display device 100 according to one or more embodiments may generate the left-eye image by correcting the planar image, based on the corrected depth map. The stereoscopic image display device 100 may generate, as the left-eye image, a planar image corrected to correspond to the target VC.

In operation 370, the stereoscopic image display device 100 according to one or more embodiments may generate a right-eye image by warping the left-eye image. The warping may be a process that manipulates an image so that at least one object included in the image is transformed and displayed. The warping may be used for image processing, image manipulation, or stereoscopic image generation. For example, the warping may include a process of digitally manipulating an image to distort and display at least one object included in a planar image so that the planar image has a three-dimensional effect. For example, the warping may include a process of performing at least one manipulation among X-axis shift, Y-axis shift, X-axis rotation, Y-axis rotation, and scaling on at least one object included in the planar image, to give the at least one object a three-dimensional effect. The stereoscopic image display device 100 may generate the right-eye image by warping the left-eye image to correspond to the target VC.

In operation 380, the stereoscopic image display device 100 according to one or more embodiments may display a stereoscopic image by outputting the left-eye image and the right-eye image. The stereoscopic image display device 100 may output the left-eye image toward the left eye of the user and the right-eye image toward the right eye of the user. The stereoscopic image display device 100 may output the left-eye image and the right-eye image to allow the user to recognize the stereoscopic image.

Figure 4:
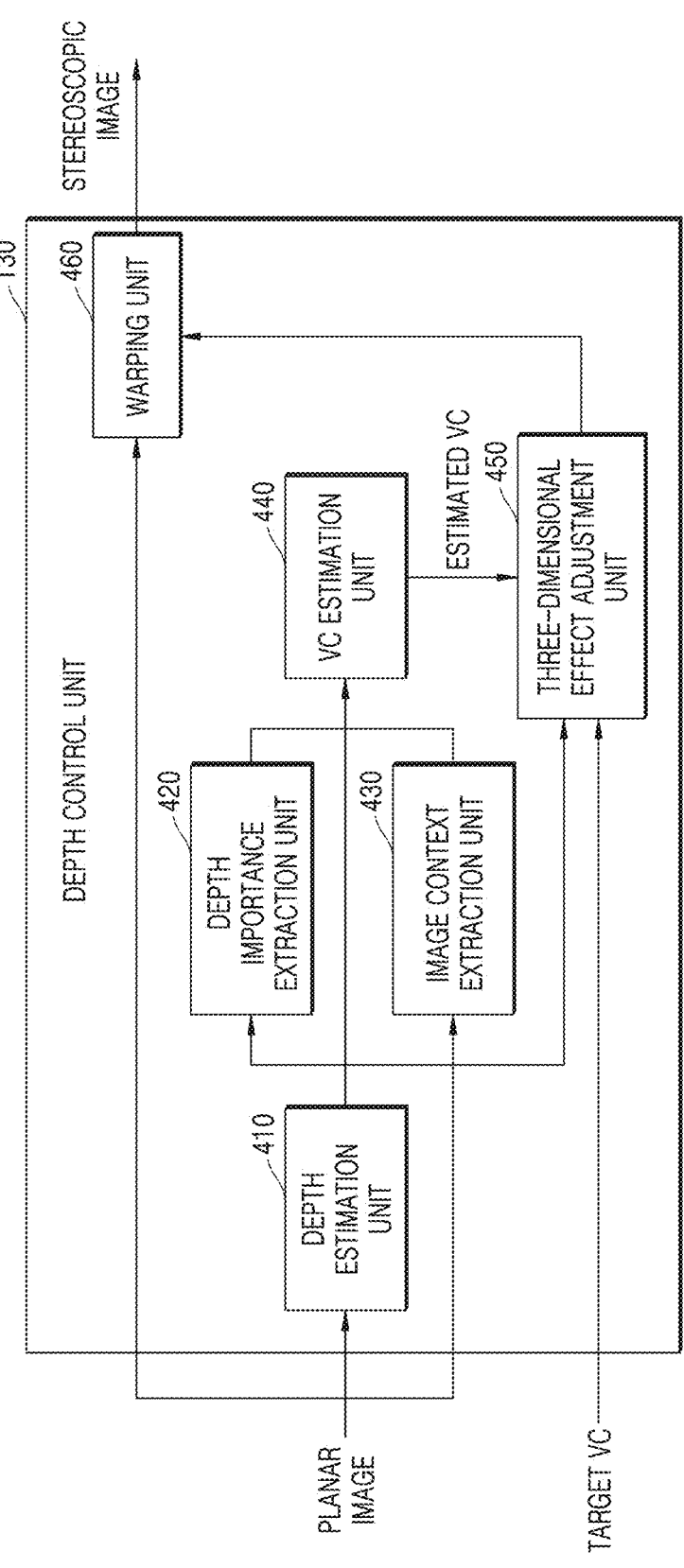
FIG. 4 is a block diagram illustrating functional units of a processor in the stereoscopic image display device according to one or more embodiments.

FIG. 4 is a block diagram illustrating functional units of the processor 130 in the stereoscopic image display device 100 according to one or more embodiments. The processor 130 according to one or more embodiments may include a depth estimation unit 410, a depth importance extraction unit 420, an image context extraction unit 430, a VC estimation unit 440, a three-dimensional effect adjustment unit 450, and a warping unit 460.

The depth estimation unit 410 may obtain a planar image. The depth estimation unit 410 may estimate a depth of the obtained planar image. The depth estimation unit 410 may extract a depth map of the obtained planar image. For example, the depth estimation unit 410 may extract a depth map of planar image data stored in the memory 120. For example, the depth estimation unit 410 may extract a depth map through a network that estimates a depth of a single planar image.

The depth importance extraction unit 420 may obtain the depth map. The depth importance extraction unit 420 may extract depth-related feature information from the depth map. The feature information may include a weighting value that contributes to VC estimation according to the depth of pixels included in the planar image. The feature information may include depth information indicating the depth of each region of the planar image and a confidence value obtained by estimating the error degree of the depth. The depth importance extraction unit 420 may extract the importance of the depth by extracting the weighting value and the confidence value.

The depth importance extraction unit 420 according to one or more embodiments may extract at least one of the weighting value or the confidence value included in the feature information. For example, the depth importance extraction unit 420 may determine an object of the planar image, based on elements such as color, texture, and motion. For example, the depth importance extraction unit 420 may assign a higher weighting value to a region where the depth of the object is large or a region closer to the depth of the object in the planar image. For example, the depth importance extraction unit 420 may determine that the error degree of the depth estimated from the planar image is proportional to the estimated confidence value.

The depth importance extraction unit 420 may transmit the extracted feature information to the VC estimation unit 440. The depth importance extraction unit 420 may transmit at least one of the extracted weighting value or the extracted confidence value to the VC estimation unit 440.

The image context extraction unit 430 may obtain the planar image. The image context extraction unit 430 may extract context information from the planar image. The context information may include an object included in the planar image, a relative size of the object, and a position of the object.

The object according to one or more embodiments may refer to an object that has the greatest influence on characteristics of the planar image as a result of measuring saliency. For example, the object may refer to an object protruding to the most front side among the objects included in the planar image. For example, the object may refer to an object located in the most back side among the objects included in the planar image. The image context extraction unit 430 may measure the saliency of each object included in the planar image. The image context extraction unit 430 may determine, as the object, an object that has the greatest influence on the characteristics of the planar image among the objects included in the planar image. For example, the image context extraction unit 430 may determine, as the object, an object protruding to the most front side or an object located in the most back side among the objects included in the planar image.

The object according to one or more embodiments may be a feature value represented in the form of a map. The object may be a value that includes at least one variable rather than a specified constant value. The object may be a concept that is distinct from an index for identifying an object. Each object may have a feature extracted and used through the network. Accordingly, when the image context extraction unit 430 does not receive an input in the form of a map as the object, the network itself may determine the object by determining whether the object has a major influence.

The relative size of the object according to one or more embodiments may refer to a ratio of the sizes of the respective objects included in the planar image. The relative size of the object may be a value that is distinct from the size calculated based on a specific criterion. The image context extraction unit 430 may calculate the relative size of the object by comparing the ratio of the sizes of the objects included in the planar image. The image context extraction unit 430 may determine that, as the ratio of the calculated relative size of the object increases, the corresponding object has a greater influence on the VC.

The position of the object according to one or more embodiments may be a portion recognized as the most important portion of the object in VC estimation. The position of the object may be distinct from a position or a coordinate value of a specific object. The position of the object may be a portion that the image context extraction unit 430 determines has the greatest influence on the object when estimating the VC. For example, the position of the object may be a portion of the object that has the greatest influence when estimating the VC by taking into account a coordinate value of a central region including the object, a boundary line of the object, a shape of the object, and saliency of the object. The image context extraction unit 430 may recognize the most important portion of the object when estimating the VC through network learning.

The context information according to one or more embodiments may include motion information related to the motion of the planar image and edge information to correct the estimated VC based on an error in a depth of the planar image.

The image context extraction unit 430 according to one or more embodiments may detect important information, such as an object included in the planar image, a relative size of the object, and a position of the object, a motion that affect the VC due to fast motion, and an edge for correcting the VC caused by the error of the depth. The image context extraction unit 430 may transmit the extracted context information to the VC estimation unit 440.

The VC estimation unit 440 may receive the depth map, the feature information, and the context information. The VC estimation unit 440 may calculate an estimated VC of the user, based on the depth map, the feature information, and the context information. The estimated VC may be VC that the user may feel when recognizing the stereoscopic image, based on the planar image. The VC estimation unit 440 may estimate the level of the VC, based on a depth map, context extracted from the planar image, and a depth-related weighting value. For example, the VC estimation unit 440 may estimate the numerical level of the VC the user feels by applying a feature extraction method to the depth map. The feature extraction method may be a method of converting raw data of the depth map into numerical features that may be processed by the VC estimation unit 440. The numerical features converted by the feature extraction method may have information included in the raw data of the depth map. For example, the VC estimation unit 440 may estimate the numerical level of the VC the user feels by applying the feature extraction method to RGB color information of the planar image. For example, the VC estimation unit 440 may implement a feature extraction method by using a network that processes feature information related to the depth of the feature image. The VC estimation unit 440 may transmit the calculated estimated VC to the three-dimensional effect adjustment unit 450.

The three-dimensional effect adjustment unit 450 may receive the depth map from the depth estimation unit 410. The three-dimensional effect adjustment unit 450 may receive the estimated VC from the VC estimation unit 440. The three-dimensional effect adjustment unit 450 may obtain a target VC. The target VC may be a threshold VC determined so that the user does not feel VC higher than the corresponding level. The target VC may include a plurality of levels. For example, the target VC may include a plurality of score levels. As the score level of the target VC increases, the VC may decrease. For example, the target VC may include score level 0, score level 1, score level 2, score level 3, and score level 4. As the target VC approaches score level 4, the VC the user feels may decrease. As the target VC approaches score level 4, a stereoscopic image similar to the planar image may be generated.

The three-dimensional effect adjustment unit 450 according to one or more embodiments may correct the depth map, based on the estimated VC and the obtained target VC. The three-dimensional effect adjustment unit 450 may receive the target VC included in user input. The three-dimensional effect adjustment unit 450 may compare the estimated VC with the target VC. The three-dimensional effect adjustment unit 450 may adjust the three-dimensional effect, based on a result of comparing the estimated VC with the target VC. For example, the three-dimensional effect adjustment unit 450 may adjust a depth range of the depth map, based on the result of comparing the estimated VC with the target VC. The depth range may refer to the degree of the three-dimensional effect that occurs when the planar image is converted into the stereoscopic image with the three-dimensional effect. The three-dimensional effect adjustment unit 450 may transmit the depth map with the adjusted three-dimensional effect to the warping unit 460.

The warping unit 460 may receive the depth map with the adjusted three-dimensional effect from the three-dimensional effect adjustment unit 450. The warping unit 460 may generate the left-eye image by correcting the planar image, based on the depth map with the adjusted three-dimensional effect. The warping unit 460 may perform adjustment according to the degree of disparity by applying, to the depth, a value output from the three-dimensional effect adjustment unit. The warping unit 460 may generate the right-eye image by warping the left-eye image. The warping unit 460 may generate the right-eye image by applying the degree of disparity to the left-eye image. The degree of disparity may refer to the visual difference between the left-eye image and the right-eye image. As the visual difference between the left-eye image and the right-eye image increases, the three-dimensional effect of the stereoscopic image may increase. As the visual difference between the left-eye image and the right-eye image increases, the VC of the stereoscopic image may increase. The warping unit 460 may display the stereoscopic image by outputting the left-eye image and the right-eye image.

The processor 130 of the stereoscopic image display device 100 according to one or more embodiments may extract factors important for VS estimation from the planar image and the estimated depth and may adjust the three-dimensional effect to the level of the target VC. The stereoscopic image display device 100 according to one or more embodiments may provide a VC prediction structure that is robust against errors that occur when estimating the depth in the planar image. The processor 130 of the stereoscopic image display device 100 according to one or more embodiments may estimate the VC by simultaneously taking into account the importance of the context information and the depth.

Figure 5:
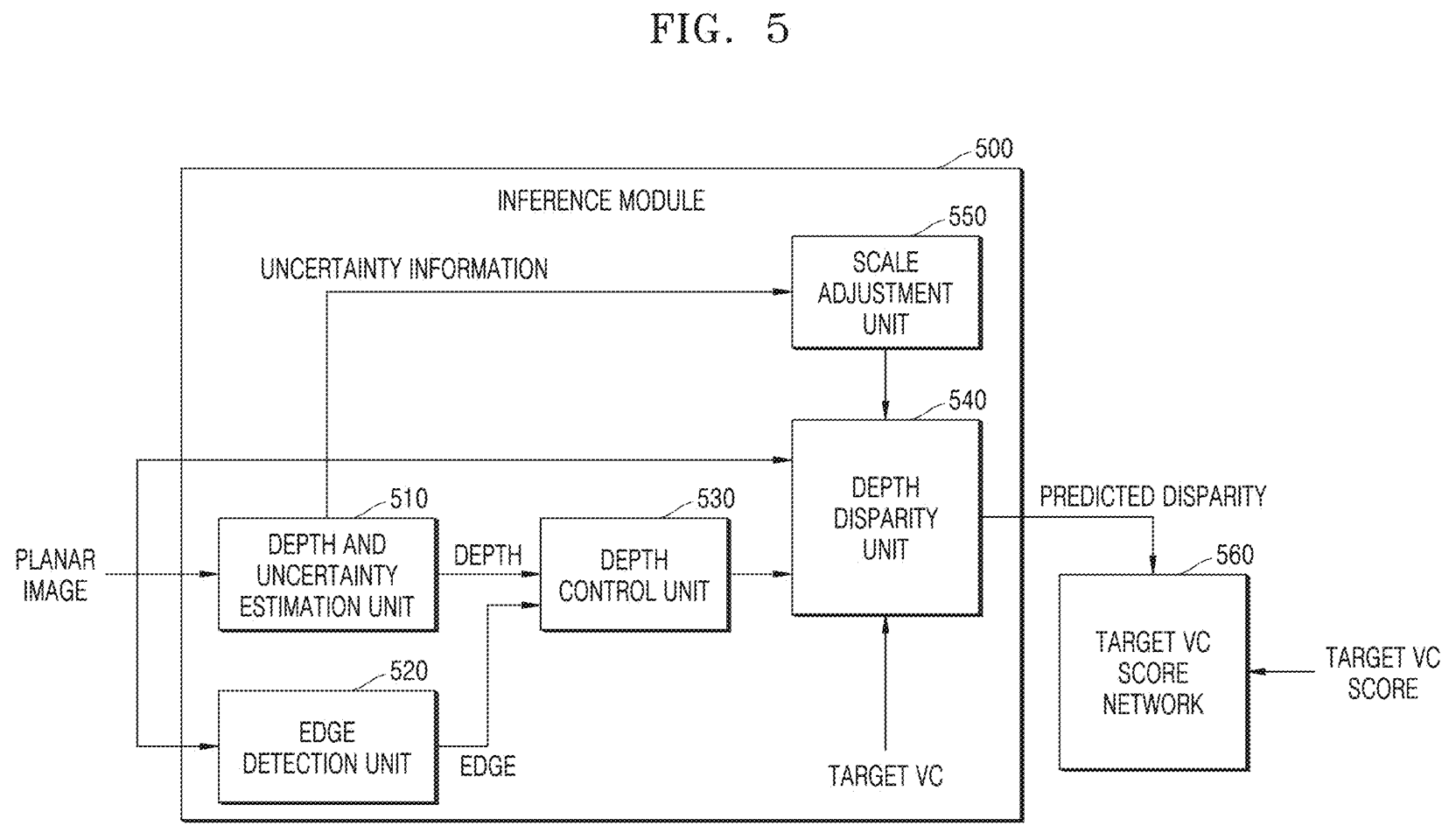

FIG. 5 is a diagram illustrating an inference module 500 and a target VC network 560 of the stereoscopic image display device 100 according to one or more embodiments. The inference module 500 according to one or more embodiments may be included in the processor 130. The inference module 500 according to one or more embodiments may include a depth and uncertainty estimation unit 510, an edge detection unit 520, a depth control unit 530, a depth disparity unit 540, and a scale adjustment unit 550.

The depth and uncertainty estimation unit 510 may receive a planar image. The depth and uncertainty estimation unit 510 may estimate a depth of the planar image. The depth and uncertainty estimation unit 510 may obtain a depth map, based on the estimated depth of the planar image. The depth and uncertainty estimation unit 510 may estimate uncertainty about the estimated depth. The depth and uncertainty estimation unit 510 may extract elements related to uncertainty among the importance of the depth.

The depth and uncertainty estimation unit 510 according to one or more embodiments may obtain uncertainty information related to uncertainty of a depth map. The depth and uncertainty estimation unit 510 may transmit the uncertainty information to the scale adjustment unit 550.

The edge detection unit 520 may receive the planar image. The edge detection unit 520 may extract an edge of the planar image. The edge detection unit 520 may extract elements related to the edge among the importance of the depth.

The depth control unit 530 may receive depth-related information from the depth and uncertainty estimation unit 510. The depth control unit 530 may receive edge-related information from the edge detection unit 520. The depth control unit 530 may control the depth, based on the depth-related information and the edge-related information. The depth control unit 530 may transmit a control result to the depth disparity unit 540.

The depth disparity unit 540 may obtain the planar image. The depth disparity unit 540 may receive the control result of the depth control unit 530. The depth disparity unit 540 may receive a target VC. The depth disparity unit 540 may receive an adjustment result of the scale adjustment unit 550. The depth disparity unit 540 may predict disparity in the depth. The depth disparity unit 540 may transmit the predicted disparity to the target VC score network 560. The depth disparity unit 540 may be referred to as Depth2Disp.

The scale adjustment unit 550 may receive the uncertainty information from the depth and uncertainty estimation unit 510. The scale adjustment unit 550 may adjust a scale of the planar image, based on the uncertainty information. The scale adjustment unit 550 may control the depth disparity unit 540 to correct the depth map, based on the uncertainty information.

The scale adjustment unit 550 according to one or more embodiments may apply a local scale to a region with high uncertainty and large negative disparity. The negative disparity may refer to the visual difference provided by the three-dimensional effect in which the object appears in front of the screen of the display 110 when the stereoscopic image display device 100 displays the stereoscopic image. The scale adjustment unit 550 may reduce noise by applying a smoothing filter to an uncertainty map.

The scale adjustment unit 550 according to one or more embodiments may calculate a first threshold value from a result of reducing noise by applying the smoothing filter. The first threshold value may be a threshold value for extracting the uncertainty map. The scale adjustment unit 550 may extract, from the uncertainty map, regions where the uncertainty is higher than the first threshold value.

The scale adjustment unit 550 according to one or more embodiments may apply non-linear mapping to a region where the negative disparity is higher than a second threshold value among the regions where the uncertainty is higher than the first threshold value. The second threshold value may be a threshold value for negative disparity which has a major influence on the VC. The non-linear mapping may be a mapping method of estimating a predicted disparity map with a plurality of values. The scale adjustment unit 550 may calculate the predicted disparity by applying at least one specific value to the depth map. When the scale adjustment unit 550 applies a single specific value to the depth map, the scale adjustment unit 550 may not take into account the uncertainty. Accordingly, the scale adjustment unit 550 may calculate the predicted disparity with a plurality of values corresponding to the uncertainty map by applying the non-linear mapping.

The scale adjustment unit 550 according to one or more embodiments may map different values to the regions with negative disparity. For example, the scale adjustment unit 550 may apply the non-linear mapping to a region where the negative disparity is greater than the second threshold value in the uncertainty map among the regions with negative disparity. Accordingly, the stereoscopic image display device 100 according to one or more embodiments may maintain the three-dimensional effect in the remaining region of the stereoscopic image while reducing the VC resulting from the negative disparity that may be felt in a specific region of the stereoscopic image.

The target VC score network 560 may receive the predicted disparity from the depth disparity unit 540. The target VC score network 560 may receive a target VC score. The target VC score network 560 may estimate the estimated VC from the input disparity. The target VC score network 560 may be used to train a model for estimating the estimated VC.

The inference module 500 of the stereoscopic image display device 100 according to one or more embodiments may reduce the VC of the stereoscopic image by using not only the depth, but also the edge component of the planar image and the depth uncertainty information. The inference module 500 may reduce errors that occur when estimating the depth from the planar image. The inference module 500 may correct at least a portion of the depth map corresponding to a region where an error is greater than or equal to a specified threshold value, based on the edge and the depth uncertainty information extracted from the planar image. For example, the inference module 500 may extract edges by applying a Sobel filter that detects a change in brightness value of an image to distinguish boundaries between different objects. For example, the inference module 500 may generate an uncertainty map representing the probability of each pixel regarding the uncertainty of the depth map. For example, when there is a region in the uncertainty map with an uncertainty probability higher than or equal to a specified threshold value, the inference module 500 may correct a region in the depth map with an uncertainty probability higher than or equal to the threshold value.

The inference module 500 of the stereoscopic image display device 100 according to one or more embodiments may obtain loss information related to the disparity between the planar image and the left-eye image. The loss information may include geometric loss, re-projection loss, and VC regression loss.

The geometric loss according to one or more embodiments may be a value obtained by comparing the predicted disparity with ground truth (GT) disparity. For example, the geometric loss may have a first loss value L1, which is a loss value resulting from the difference between the ground truth disparity and the predicted disparity.

The re-projection loss according to one or more embodiments may be a loss value between the warped stereoscopic image and the planar image. The re-projection loss may be a loss value calculated by applying a mask to the warped stereoscopic image and the planar image, excluding an occlusion region. The occlusion region may be a region that is not visible in the left-eye image but is visible only in the right-eye image. The occlusion may be a phenomenon caused by binocular parallax. The mask may be a binary mask. An image of the occlusion region may be inaccurate. To prevent errors from occurring when calculating re-projection loss due to the inaccurate image of the occlusion region, the inference module 500 may assume that the occlusion region is 0 when calculating re-projection loss. To assume that the occlusion region is 0, the inference module 500 may apply a binary mask to the warped stereoscopic image and the planar image. For example, the re-projection loss may have the same first loss value L1 as the geometric loss.

The VC regression loss according to one or more embodiments may be a value obtained by measuring the VC score of the generated disparity.

The inference module 500 according to one or more embodiments may be trained by using loss information when training the estimated VC. The inference module 500 may be trained to adjust the disparity to reduce the VC while maximally reflecting the three-dimensional effect and image quality inherent in the original stereoscopic image through the geometric loss and the re-projection loss.

Figure 6:
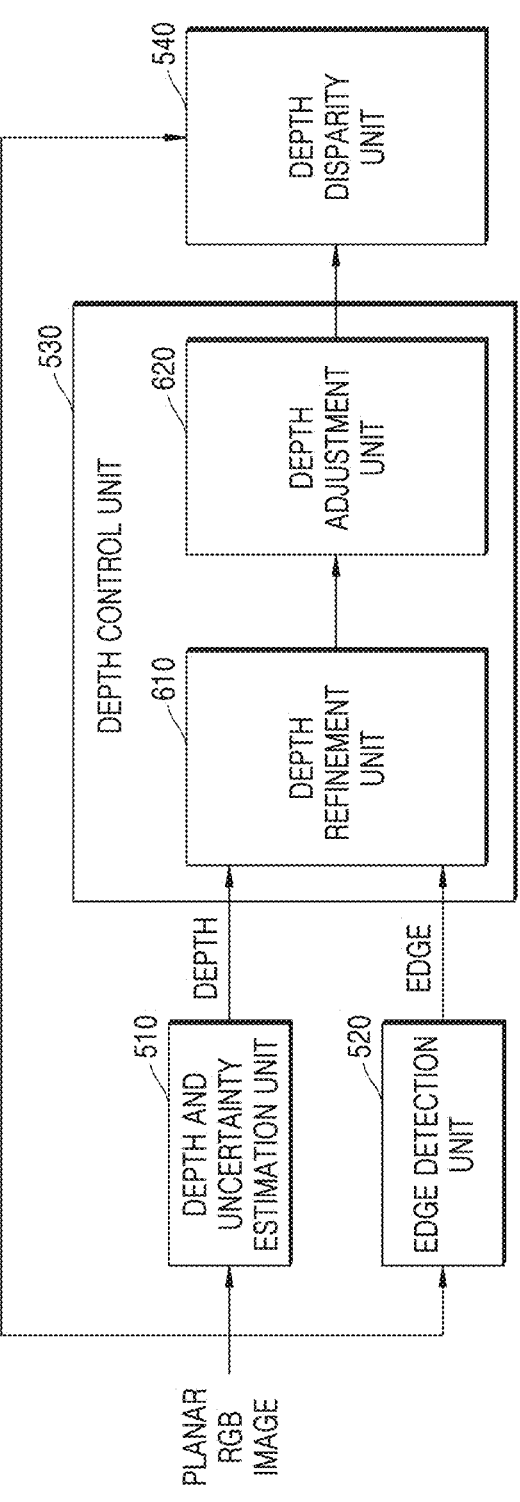
FIG. 6 is a diagram illustrating that the stereoscopic image display device according to one or more embodiments generates a stereoscopic image, based on a planar image.

FIG. 6 is a diagram illustrating that the stereoscopic image display device 100 according to one or more embodiments generates a stereoscopic image, based on a planar image. The stereoscopic image display device 100 according to one or more embodiments may include a depth and uncertainty estimation unit 510, an edge detection unit 520, a depth control unit 530, and a depth disparity unit 540. The depth control unit 530 according to one or more embodiments may include a depth refinement unit 610 and a depth adjustment unit 620.

The depth and uncertainty estimation unit 510 according to one or more embodiments may receive a planar RGB image. The planar RGB image may be a planar image including RGB values. The depth and uncertainty estimation unit 510 may estimate a depth of the planar RGB image. The depth and uncertainty estimation unit 510 may transmit the extracted depth to the depth refinement unit 610.

The edge detection unit 520 according to one or more embodiments may receive the planar RGB image. The edge detection unit 520 may extract an edge of the planar RGB image. The edge detection unit 520 may transmit the extracted edge to the depth refinement unit 610.

The depth refinement unit 610 may receive the depth from the depth and uncertainty estimation unit 510. The depth refinement unit 610 may receive the edge from the edge detection unit 520. The depth refinement unit 610 may clarify the edge of the planar RGB image, based on the edge. The depth refinement unit 610 may separate an object and a background in the planar RGB image. The depth refinement unit 610 may increase the three-dimensional effect of the planar RGB image. The depth refinement unit 610 may reduce a phenomenon in which errors propagate and VC increases when generating the stereoscopic image due to blurry edges at the boundary of the object. The depth refinement unit 610 may reduce the VC of the planar RGB image.

The depth adjustment unit 620 may analyze a depth range of the planar RGB image. The depth range of the planar RGB image may be set by a distance from a camera when obtaining the planar RGB image. The planar RGB image obtained by the stereoscopic image display device 100 may be obtained by the camera of the stereoscopic image display device 100 or an external camera. Objects that are closer to the camera among the objects included in the planar RGB image may have a greater influence on the VC. The depth adjustment unit 620 may adjust a depth of a depth map to reduce the VC.

The depth adjustment unit 620 according to one or more embodiments may reduce a three-dimensional effect of a threshold region in the depth map, whose depth is greater than or equal to a predetermined depth. The depth adjustment unit 620 may reduce the three-dimensional effect of the threshold region in the depth map, whose depth is greater than or equal to the predetermined depth, while maintaining the three-dimensional effect of the remaining portions of the stereoscopic image generated based on the planar RGB image. Accordingly, the depth adjustment unit 620 may reduce the VC that occurs in the stereoscopic image, particularly in the threshold region that strongly causes the VC.

The depth disparity unit 540 may calculate a scale and an offset by receiving the planar RGB image and the depth as input to convert depth into disparity. The depth disparity unit 540 may calculate the disparity as depth*scale+offset. The offset may have influence on a zero plane. The zero plane may be a region where there is no visual difference between the left-eye image and the right-eye image. The scale may have influence on the visual difference between the left-eye image and the right-eye image. Due to two factors, that is, the scale and the offset, the zero plane and the visual difference may be differently generated for each screen of the stereoscopic image. The depth disparity unit 540 may transmit the generated disparity to the target VC score network 560. When training the depth disparity unit 540 through the target VC score network 560, the depth disparity unit 540 may adjust the disparity, based on feedback received from the target VC score network 560. When the inference module 500 performs inference, the depth disparity unit 540 may generate a value related to the disparity without information received from the target VC score network 560.

FIG. 7 is a diagram illustrating stereoscopic images the stereoscopic image display device 100 according to one or more embodiments displays by taking into account VC.

A first stereoscopic image 710 may be a stereoscopic image before VC is reduced. The first stereoscopic image 710 may be a stereoscopic image before depth map non-linear mapping using depth map edge enhancement and uncertainty map is applied. Each of a first object 711 and a second object 712 of the first stereoscopic image 710 is spaced left and right by a first distance d1 to generate a visual difference, thereby allowing a user to feel a three-dimensional effect. Because the first distance d1 is greater than or equal to a threshold distance, the VC may occur.

A second stereoscopic image 720 may be a stereoscopic image after VC is reduced by a first degree. For example, the second stereoscopic image 720 may be a stereoscopic image to which a target VC score level of 3.0 is applied. Each of a first object 721 and a second object 722 of the second stereoscopic image 720 is spaced left and right by a second distance d2 to generate a visual difference, thereby allowing a user to feel a three-dimensional effect. Because the second distance d2 is less than the threshold distance, the VC may be reduced.

A third stereoscopic image 730 may be a stereoscopic image after VC is reduced by a second degree. The third stereoscopic image 730 may have a higher target VC score level than that of the second stereoscopic image 720. For example, the third stereoscopic image 730 may be a stereoscopic image to which a target VC score level of 4.0 is applied. A left-and-right separation distance between a first object 731 and a second object 732 of the third stereoscopic image 730 may be a minute distance that is difficult to recognize with the naked eye. The third stereoscopic image 730 may further reduce the VC.

The stereoscopic image display device 100 according to one or more embodiments may generate a stereoscopic image by setting a target VC level between 2.0 and 4.0. For example, as the target VC score level set by the stereoscopic image display device 100 decreases, the possibility that the VC occurs due to negative disparity may increase. For example, as the target VC score level set by the stereoscopic image display device 100 increases, the three-dimensional effect of the stereoscopic image may be reduced, but the overall disparity range may be reduced, and thus, the VC may be reduced.

Figure 8:
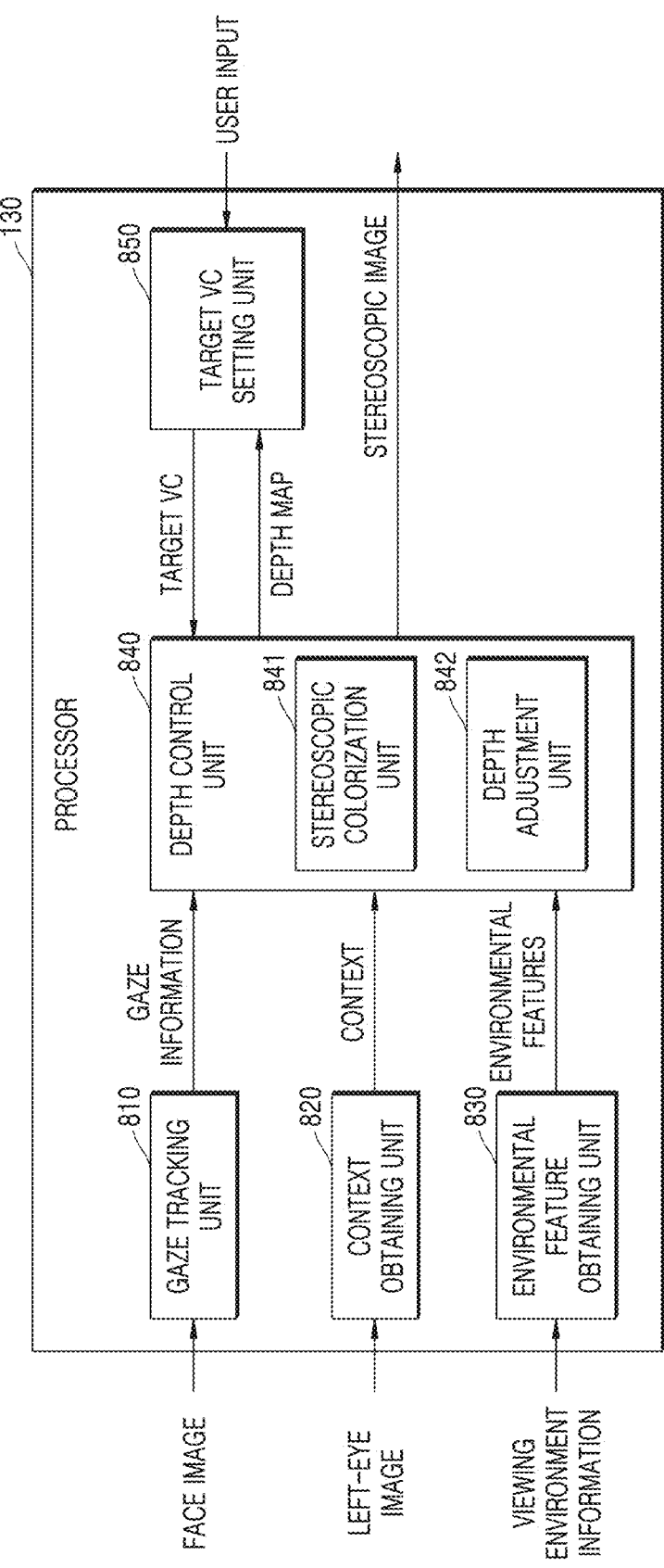
FIG. 8 is a block diagram illustrating functional units that are included in the processor of the stereoscopic image display device according to one or more embodiments and control depth, by taking into account a user's gaze.

FIG. 8 is a block diagram illustrating functional units that are included in the processor 130 of the stereoscopic image display device 100 according to one or more embodiments and control depth, by taking into account a user's gaze. The processor 130 of the stereoscopic image display device 100 may include a gaze tracking unit 810, a context obtaining unit 820, an environmental feature obtaining unit 830, a depth control unit 840, and a target VC setting unit 850. The depth control unit 840 may include a stereoscopic colorization unit 841 and a depth adjustment unit 842.

The gaze tracking unit 810 may obtain a face image. The face image may be an image including a user's face. The face image may be an image that shows a gaze direction of the user. The gaze tracking unit 810 may track a user's gaze from the face image. The gaze tracking unit 810 may obtain gaze information from the face image. The gaze information may include information related to a region where the user's gaze is directed in the stereoscopic image. The gaze information may include information related to features of the user. The gaze tracking unit 810 may transmit the gaze information to the depth control unit 840.

The context obtaining unit 820 may obtain a left-eye image. The left-eye image may be an image input to the left eye of the user. The context obtaining unit 820 may obtain context from the left-eye image. The context may include information related to features of a depth map corresponding to the left-eye image. The context may include information related to features of content included in the left-eye image. The context obtaining unit 820 may transmit the context to the depth control unit 840.

The environmental feature obtaining unit 830 may obtain viewing environment information. The viewing environment information may include information related to the specifications of images the user is viewing. For example, the viewing environment information may include at least one of the color of the image, the illuminance of the image, the contrast of the image, or the display size of the image. The environmental feature obtaining unit 830 may obtain environmental features from the viewing environment information. Environmental features may include at least one of the color of the image, the illuminance of the image, the contrast of the image, or the display size of the image. The environmental feature obtaining unit 830 may transmit the environmental features to the depth control unit 840.

The depth control unit 840 may obtain the gaze information from the gaze tracking unit 810. The depth control unit 840 may obtain the context from the context obtaining unit 820. The depth control unit 840 may obtain the environmental features from the environmental feature obtaining unit 830. The depth control unit 840 may correct the depth map, based on the gaze information, the context, and the environmental features. The depth map may include information related to the depth of the planar image.

The depth control unit 840 may transmit the corrected depth map to the target VC setting unit 850. The depth control unit 840 may receive the target VC from the target VC setting unit 850. The depth control unit 840 may adjust the depth of the planar image, based on the gaze information, the context, the environmental features, and the target VC. The depth control unit 840 may generate a stereoscopic image by adjusting the depth of the planar image. The depth control unit 840 may output the stereoscopic image.

The target VC setting unit 850 may receive user input. The user input may include information related to the target VC. For example, the user input may include the target VC score level of the stereoscopic image. The target VC setting unit 850 may receive a depth map corrected by the depth control unit 840. The target VC setting unit 850 may transmit the target VC to the depth control unit 840.

The stereoscopic image display device 100 according to one or more embodiments may track a region where the user's gaze stays by using gaze tracking technology. The stereoscopic image display device 100 may extract the depth of the region where the user's gaze actually stays, the characteristics of the content, and the motion of the object. The stereoscopic image display device 100 may use an extraction result to predict the VC. The stereoscopic image display device 100 may calculate the VC by utilizing information about the content of the region where the user's gaze actually stays. For example, the stereoscopic image display device 100 may calculate region-based VC by recognizing information and features of the content of the region where the user's gaze stays. The stereoscopic image display device 100 may weight information of the region the user views and use the weighted information. For example, the stereoscopic image display device 100 may perform different VC and depth adjustments for the same planar image according to the position at which the user's gaze stays.

The stereoscopic image display device 100 according to one or more embodiments may predict the VC by taking into account the region where the user's gaze stays, thereby increasing the accuracy of the prediction result. In particular, when the stereoscopic image display device 100 is a device to which virtual studio technology (VST) is applied, the stereoscopic image display device 100 according to one or more embodiments may more reliably improve the accuracy of extracting the region where the user's gaze stays.

The stereoscopic image display device 100 according to one or more embodiments may preemptively reduce the VC in the region of the stereoscopic image in which the user's gaze stays through learning. The stereoscopic image display device 100 may learn information about the objects and the region where the user's gaze stays. When learning the region where the user's gaze stays, the stereoscopic image display device 100 may learn gaze motion based on the characteristics of the content and gaze motion based on the user's viewing characteristics and user preferences. For example, the stereoscopic image display device 100 may learn content in which the user is interested, actors preferred by the user, and gaze motion due to subtitles.

The stereoscopic image display device 100 according to one or more embodiments may obtain the user's viewing habits, based on the learning result. The stereoscopic image display device 100 may predict the region where the user's gaze is to be directed, based on the user's viewing habits. The stereoscopic image display device 100 may use information related to the user's viewing habits in conjunction with a personal account. For example, the stereoscopic image display device 100 may store and update the information related to the user's viewing habits in a personalized device or a personal account.

The stereoscopic image display device 100 according to one or more embodiments may provide a stereoscopic image with low VC by pre-adjusting the depth of the region where the user's gaze is predicted to be directed. For example, the stereoscopic image display device 100 may limit, within a threshold range, the depth range of the region where the user's gaze may stay. For example, the stereoscopic image display device 100 may map, to 0, the depth of the region where the user's gaze may stay. Accordingly, the stereoscopic image display device 100 according to one or more embodiments may preemptively generate a stereoscopic image with low VC.

The stereoscopic image display device 100 according to one or more embodiments may control the VC by taking into account the stereoscopic image and the depth. The stereoscopic image display device 100 may reduce the VC through stereoscopic image optimization and depth scaling. The stereoscopic image display device 100 may apply at least one of the stereoscopic image optimization or the depth scaling according to the VC of the stereoscopic image. For example, the stereoscopic image display device 100 may apply the stereoscopic image optimization when the depth range of the stereoscopic image is within a specified range. The stereoscopic image display device 100 may apply the stereoscopic image optimization to a stereoscopic image including content that may be three-dimensionally perceived even when the depth is small. For example, the stereoscopic image display device 100 may apply the stereoscopic image optimization to a stereoscopic image in which a single object is moving in front or the perspective is prominent.

One or more embodiments may provide an algorithm for predicting VC by taking into account characteristics of each stereoscopic image and each user. In addition, one or more embodiments may provide an algorithm pipeline that predicts a cumulative value of a user's VC through observation of a user's biometric signals when viewing a stereoscopic image and reflects the predicted cumulative value in adjusting a three-dimensional effect in real time. Accordingly, one or more embodiments may provide an objective indictor-based VC prediction algorithm for predicting and reflecting real-time discomfort.

FIG. 9 is a diagram illustrating stereoscopic images the stereoscopic image display device 100 according to one or more embodiments displays by taking into account a user's gaze.

A fourth stereoscopic image 910 may be a stereoscopic image before applying gaze information. The fourth stereoscopic image 910 may be displayed so that a first object 911 and a second object 912 have the same three-dimensional effect. Each of the first object 911 and the second object 912 of the fourth stereoscopic image 910 may be focused to the same degree.

A fifth stereoscopic image 920 may be a stereoscopic image to which gaze information regarding gaze motion toward the second object 922 is applied. The fifth stereoscopic image 920 may be displayed so that the second object 922 has a greater three-dimensional effect than the first object 921. In the fifth stereoscopic image 920, the second object 922 may be more focused than the first object 921. In the fifth stereoscopic image 920, the first object 921 may be blurred.

A sixth stereoscopic image 930 may be a stereoscopic image to which gaze information regarding gaze motion toward a first object 931 is applied. The sixth stereoscopic image 930 may be displayed so that the first object 931 has a greater three-dimensional effect than the second object 932. In the sixth stereoscopic image 930, the first object 931 may be more focused than the second object 932. In the sixth stereoscopic image 930, the second object 932 may be blurred.

The stereoscopic image display device 100 according to one or more embodiments may predict the VC, based on biometric signals. For example, the stereoscopic image display device 100 may include a gaze tracking sensor module. The stereoscopic image display device 100 may obtain gaze information by using the gaze tracking sensor module. The stereoscopic image display device 100 may predict the VC, based on the gaze information.

The stereoscopic image display device 100 according to one or more embodiments may obtain user profile information before the user views the stereoscopic image. The stereoscopic image display device 100 may obtain at least one of user age information, user pupil size information, or user inter-pupil distance information. For example, the stereoscopic image display device 100 may obtain a user's age by using user input or pre-stored user information. For example, the stereoscopic image display device 100 may obtain a user's pupil size and a distance between a user's pupils by using user input or facial information.

The stereoscopic image display device 100 according to one or more embodiments may obtain viewing environment information before the user views the stereoscopic image. For example, the stereoscopic image display device 100 may obtain at least one of peripheral illumination information, current time information, or viewing distance information.

The stereoscopic image display device 100 according to one or more embodiments may obtain gaze information while the user is viewing the stereoscopic image. For example, the stereoscopic image display device 100 may acquire biometric signals such as the user's eye movement speed and the user's eye blink. For example, the stereoscopic image display device 100 may obtain facial expression information of the user and predict whether the user feels visual discomfort. For example, the stereoscopic image display device 100 may determine whether the user has difficulty focusing by determining whether the user's gaze is fixed and measuring saccade of the user's eyes. For example, the stereoscopic image display device 100 may detect a saliency region where the user's gaze stays in the stereoscopic image.

The stereoscopic image display device 100 according to one or more embodiments may predict the VC, based on the content of the stereoscopic image, while the user is viewing the stereoscopic image. For example, the stereoscopic image display device 100 may predict the VC by obtaining quality of the stereoscopic image, a genre of the stereoscopic image, complexity of the stereoscopic image, a size of motion of the stereoscopic image on a plane, and a size of motion of the stereoscopic image in a depth direction.

The stereoscopic image display device 100 according to one or more embodiments may output a depth according to a VC score by taking into account the three-dimensional effect and the VC by using a depth adjustment network. The depth adjustment network may reduce the VC, based on a gaze tracking map.

Figure 10:
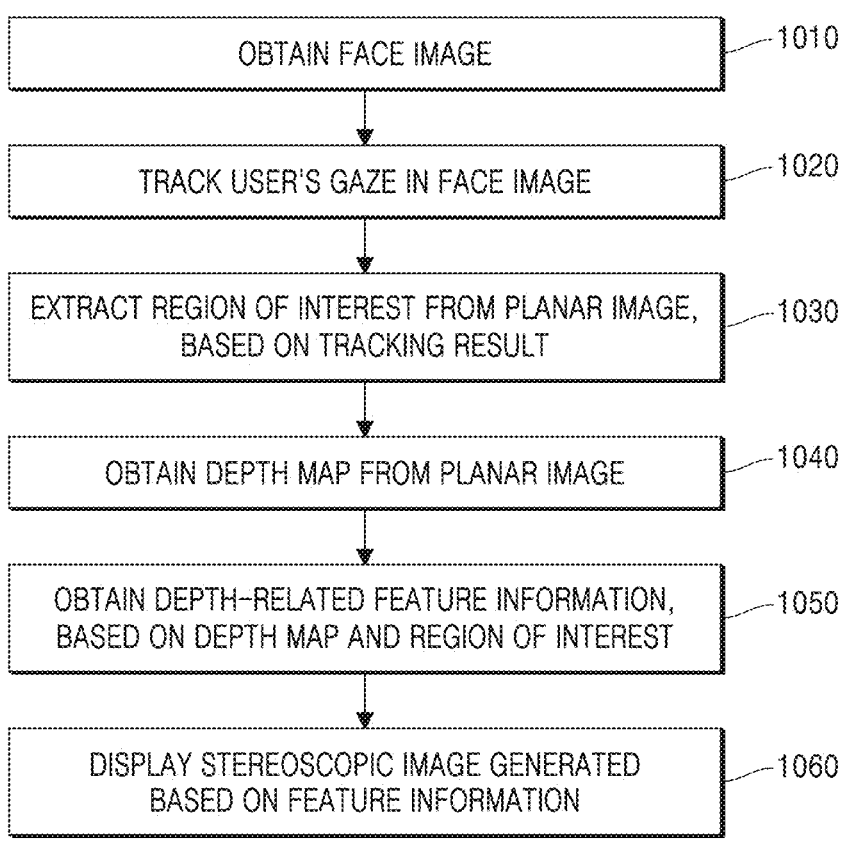
FIG. 10 is a flowchart of a method, performed by the stereoscopic image display device, of displaying a stereoscopic image by taking into account a user's gaze, according to one or more embodiments.

FIG. 10 is a flowchart of a method, performed by the stereoscopic image display device 100, of displaying a stereoscopic image by taking into account the user's gaze, according to one or more embodiments.

In operation 1010, the stereoscopic image display device 100 according to one or more embodiments may obtain a face image. The stereoscopic image display device 100 may include a camera module. The stereoscopic image display device 100 may capture a user's face by using the camera module.

In operation 1020, the stereoscopic image display device 100 according to one or more embodiments may track a user's gaze in the face image. The stereoscopic image display device 100 may obtain gaze information of the user by tracking the user's gaze. For example, by tracking the user's gaze, the stereoscopic image display device 100 may obtain information about a direction in which the user's gaze is directed, a map showing where the user's gaze is directed, or coordinate information on the stereoscopic image toward which the user's gaze is directed. The stereoscopic image display device 100 may obtain a user's facial expression features by tracking the user's gaze. The stereoscopic image display device 100 may obtain eye motion information of the user by tracking the user's gaze. The stereoscopic image display device 100 may obtain gaze information of the user in real time.

In operation 1030, the stereoscopic image display device 100 according to one or more embodiments may extract a region of interest from the planar image, based on a tracking result. The region of interest may include a region where the user's gaze stays and a region where the user's gaze is directed. The stereoscopic image display device 100 may accumulate information related to the position where the gaze is directed within the stereoscopic image. The stereoscopic image display device 100 may extract the region of interest, based on the accumulated information. For example, the stereoscopic image display device 100 may extract the region of interest by combining object information and gaze information of the stereoscopic image and determining whether the user is observing the object of the stereoscopic image. For example, the stereoscopic image display device 100 may extract the region of interest by weighting vergence-accommodation conflict (VAC) of the region where the user's gaze stays.

In operation 1040, the stereoscopic image display device 100 according to one or more embodiments may obtain a depth map from a planar image. The stereoscopic image display device 100 may obtain a depth for each region of the planar image. The stereoscopic image display device 100 may obtain a depth map by using the obtained depth for each region.

In operation 1050, the stereoscopic image display device 100 according to one or more embodiments may obtain depth-related feature information, based on the depth map and the region of interest. The feature information may include information indicating the depth of the region of interest in more detail. For example, the feature information may include at least one of a depth range, a depth gradient map, or positive/negative depth information.

The stereoscopic image display device 100 according to one or more embodiments may more precisely obtain depth-related feature information from the region of interest to correct the region of interest. For example, the stereoscopic image display device 100 may obtain feature information by determining the depth of the object in the region of interest as a reference height. For example, the stereoscopic image display device 100 may adjust the depth with respect to the region of interest.

In operation 1060, the stereoscopic image display device 100 according to one or more embodiments may display a stereoscopic image generated based on the feature information. The stereoscopic image display device 100 may adjust the VC of the region of interest, based on the feature information. For example, the stereoscopic image display device 100 may limit a depth adjustment value centered on the region of interest to a threshold value. Accordingly, the stereoscopic image display device 100 may reduce the VC by reducing the phenomenon of sudden changes in depth or three-dimensional effects centered on the region of interest.

Figure 11:
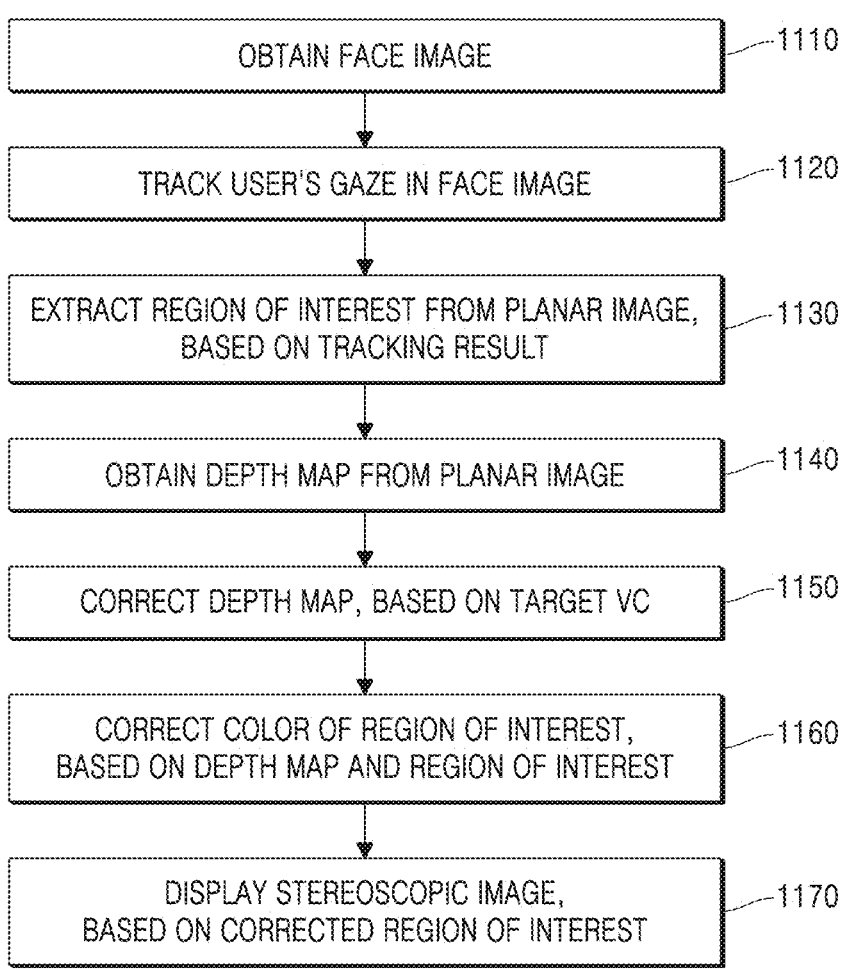
FIG. 11 is a flowchart of a method, performed by the stereoscopic image display device, of correcting a color of a stereoscopic image by taking into account a user's gaze, according to one or more embodiments.

FIG. 11 is a flowchart of a method, performed by the stereoscopic image display device 100, of correcting a color of a stereoscopic image by taking into account a user's gaze, according to one or more embodiments.

In operation 1110, the stereoscopic image display device 100 according to one or more embodiments may obtain a face image. The stereoscopic image display device 100 may include a camera module. The stereoscopic image display device 100 may capture a user's face by using the camera module.

In operation 1120, the stereoscopic image display device 100 according to one or more embodiments may track a user's gaze in the face image. The stereoscopic image display device 100 may include a gaze tracking sensor module. The stereoscopic image display device 100 may obtain information related to a user's eye motion by using the gaze tracking sensor module. For example, the stereoscopic image display device 100 may use the gaze tracking sensor module to track at least one eye motion selected from a user's eye blink, eye fixation, saccade, scan path length, and vergence.

The stereoscopic image display device 100 according to one or more embodiments may measure feature information for each user by using the gaze tracking sensor module. For example, the stereoscopic image display device 100 may use the gaze tracking sensor module to measure information related to at least one of a user's age, a user's pupil size, a user's inter-pupil distance, a region where the user's eyes stay, and a user's facial expression.

In operation 1130, the stereoscopic image display device 100 according to one or more embodiments may extract a region of interest from the planar image, based on a tracking result. The region of interest may include a region where the user's gaze stays and a region where the user's gaze is directed. The stereoscopic image display device 100 may accumulate information related to the position where the gaze is directed within the stereoscopic image. The stereoscopic image display device 100 may extract the region of interest, based on the accumulated information. For example, the stereoscopic image display device 100 may extract the region of interest by combining object information and gaze information of the stereoscopic image and determining whether the user is observing the object of the stereoscopic image.

In operation 1140, the stereoscopic image display device 100 according to one or more embodiments may obtain a depth map from a planar image. The stereoscopic image display device 100 may obtain a depth for each region of the planar image. The stereoscopic image display device 100 may obtain a depth map by using the obtained depth for each region.

In operation 1150, the stereoscopic image display device 100 according to one or more embodiments may correct the depth map, based on the target VC. The stereoscopic image display device 100 may correct the depth of the stereoscopic image to satisfy the target VC by using a depth adjustment network. For example, the stereoscopic image display device 100 may correct the depth of the stereoscopic image to be less than or equal to a threshold depth set according to the target VC. The stereoscopic image display device 100 may correct the depth of the stereoscopic image with respect to the reference plane set in the depth adjustment network.

In operation 1160, the stereoscopic image display device 100 according to one or more embodiments may correct the color of the region of interest, based on the depth map and the region of interest. The stereoscopic image display device 100 may include a colorization module. The stereoscopic image display device 100 may perform colorization for the stereoscopic image by using the colorization module. The stereoscopic image display device 100 may adjust the three-dimensional effect of the stereoscopic image through colorization. The stereoscopic image display device 100 may colorize the region of interest, based on the depth value in the depth map. The stereoscopic image display device 100 may determine the correction degree of color of the region of interest, based on the size of the region of interest, the position of the region of interest, and the depth value in the region of interest.

The stereoscopic image display device 100 according to one or more embodiments may adjust the VC and the three-dimensional effect of the stereoscopic image by using at least one of colorization or depth adjustment. For example, the stereoscopic image display device 100 may output a planar image with a depth of 0 by using only colorization. For example, the stereoscopic image display device 100 may output a stereoscopic image with more three-dimensional effect at the same depth by using colorization after depth adjustment. For example, the stereoscopic image display device 100 may output a stereoscopic image with reduced VC while providing the same three-dimensional effect by using depth adjustment after colorization.

The stereoscopic image display device 100 according to one or more embodiments may perform colorization by taking into account the region of interest. For example, the stereoscopic image display device 100 may improve the image quality of the stereoscopic image by colorizing the region of interest of the user. For example, the stereoscopic image display device 100 may improve the three-dimensional effect of the stereoscopic image by colorizing the region of interest of the user.

In operation 1170, the stereoscopic image display device 100 according to one or more embodiments may display a stereoscopic image, based on the corrected region of interest. The stereoscopic image display device 100 may adjust the VC of the region of interest, based on feature information. For example, the stereoscopic image display device 100 may limit a color change value centered on the region of interest to a threshold value. Accordingly, the stereoscopic image display device 100 may reduce the VC by reducing the phenomenon of sudden changes in color or three-dimensional effects centered on the region of interest.

The stereoscopic image display device according to one or more embodiments may include a display, a memory storing at least one instruction, and at least one processor. A stereoscopic image display device according to one or more embodiments includes a display, a memory storing at least one instruction, and at least one processor, wherein the at least one instruction, when executed by the at least one processor, causes the at least one processor to obtain a depth map from a planar image, obtain feature information related to a depth from the depth map, obtain context information of the planar image, calculate a user's estimated VC, based on the depth map, the feature information, and the context information, wherein the estimated VC indicates VC that the user feels when recognizing the stereoscopic image, correct the depth map, based on the estimated VC and a target VC, generate a left-eye image by correcting the planar image, based on the corrected depth map, generate a right-eye image by warping the left-eye image, and output the left-eye image and the right-eye image so that the display displays a stereoscopic image.

According to one or more embodiments, the feature information may include a weighting value contributing to VC estimation according to a depth of a pixel included in the planar image.

According to one or more embodiments, the feature information may include depth information indicating a depth of each region of the planar image and a confidence value obtained by estimating an error degree of the depth.

According to one or more embodiments, the context information may include an object included in the planar image, a relative size of the object, and a position of the object.

According to one or more embodiments, the context information may include motion information related to a motion of the planar image and edge information to correct the estimated VC based on an error in a depth of the planar image.

According to one or more embodiments, the at least one instruction, when executed by the at least one processor, may cause the at least one processor to obtain uncertainty information related to uncertainty of the depth map, and correct the depth map, based on the uncertainty information.

According to one or more embodiments, the at least one instruction, when executed by the at least one processor, may cause the at least one processor to obtain loss information related to disparity between the planar image and the left-eye image.

According to one or more embodiments, the at least one instruction, when executed by the at least one processor, may cause the at least one processor to reduce a three-dimensional effect of a threshold region whose depth is greater than or equal to a specified threshold depth in the depth map.

According to one or more embodiments, the at least one instruction, when executed by the at least one processor, may cause the at least one processor to extract a region of interest from the planar image, based on a result of tracking a user's gaze, and obtain the feature information, based on the depth map and the region of interest.

According to one or more embodiments, the at least one instruction, when executed by the at least one processor, may cause the at least one processor to correct a color of the region of interest, based on the depth map and the region of interest.

A method of controlling a stereoscopic image display device, according to one or more embodiments, includes obtaining a depth map from a planar image, obtaining feature information related to a depth from the depth map, obtaining context information of the planar image, calculating a user's estimated VC, based on the depth map, the feature information, and the context information, wherein the estimated VC indicates VC that the user feels when recognizing the stereoscopic image, correcting the depth map, based on the estimated VC and a target VC, generating a left-eye image by correcting the planar image, based on the corrected depth map, generating a right-eye image by warping the left-eye image, and displaying a stereoscopic image by outputting the left-eye image and the right-eye image.

According to one or more embodiments, the feature information may include a weighting value contributing to VC estimation according to a depth of a pixel included in the planar image.

According to one or more embodiments, the feature information may include depth information indicating a depth of each region of the planar image and a confidence value obtained by estimating an error degree of the depth.

According to one or more embodiments, the context information may include an object included in the planar image, a relative size of the object, and a position of the object.

According to one or more embodiments, the context information may include motion information related to a motion of the planar image and edge information to correct the estimated VC based on an error in a depth of the planar image.

According to one or more embodiments, the method may further include obtaining uncertainty information related to uncertainty of the depth map, and correcting the depth map, based on the uncertainty information.

According to one or more embodiments, the method may further include obtaining loss information related to disparity between the planar image and the left-eye image.

According to one or more embodiments, the method may further include reducing a three-dimensional effect of a threshold region whose depth is greater than or equal to a specified threshold depth in the depth map.

According to one or more embodiments, the method may further include extracting a region of interest from the planar image, based on a result of tracking a user's gaze, and obtaining the feature information, based on the depth map and the region of interest.

According to one or more embodiments, the method may further include correcting a color of the region of interest, based on the depth map and the region of interest.

The stereoscopic image display device and the method of controlling the same, according to one or more embodiments, may have an effect of generating the stereoscopic image with low VC by estimating the VC when the planar image is received and the stereoscopic image is generated, and generating the stereoscopic image whose three-dimensional effect is adjusted so that the estimated VC corresponds to the target VC.

The method according to one or more embodiments may be implemented in the form of program commands that are executable through a variety of computer means and may be recorded on a computer-readable recording medium. The computer-readable storage medium may include program commands, data files, or data structures, for example, alone or in combination. The program commands recorded on the computer-readable storage medium may be configured for performing operations for one or more embodiments. Examples of the computer-readable storage medium may include magnetic media, such as hard disk, floppy disk, and magnetic tape, optical media, such as compact disc read-only memory (CD-ROM) and digital versatile disc (DVD), magneto-optical media, such as floptical disk, and hardware devices specially configured to store and execute program commands, such as ROM, RAM, and flash memory. Examples of the program commands may include not only machine language code generated by a compiler but also high-level language code that is executable using an interpreter by a computer.

One or more embodiments may also be implemented in the form of a recording medium including commands executable by a computer, such as a program module executed by a computer. A computer-readable recording medium may be any available media that are accessible by the computer and may include any volatile and non-volatile media and any removable and non-removable media. In addition, the computer-readable recording medium may include a computer storage medium and a communication medium. The computer-readable storage medium may include any volatile, non-volatile, removable, and non-removable media that are implemented in any method or technology for storage of information, such as computer-readable instructions, data structures, program modules, or other data. The communication medium may include computer-readable instructions, data structures, program modules, other data of a modulated data signal, such as carriers, or other transmission mechanisms, and may include any information delivery medium. In addition, one or more embodiments may be implemented as a computer program or a computer program product, which includes instructions executable by a computer, such as a computer program executed by a computer.

A machine-readable storage medium may be provided in the form of a non-transitory storage medium. The non-transitory storage medium is a tangible device and only means not including a signal (for example, electromagnetic wave). This term does not distinguish between a case where data is semi-permanently stored in a storage medium and a case where data is temporarily stored in a storage medium. For example, the non-transitory storage medium may include a buffer in which data is temporarily stored.

The method according to one or more embodiments may be provided by being included in a computer program product. The computer program product may be traded between a seller and a buyer as commodities. The computer program product may be distributed in the form of a machine-readable storage medium (for example, CD-ROM), or may be distributed (for example, downloaded or uploaded) online either via an application store or directly between two user devices (for example, smartphones). In the case of the online distribution, at least a part of a computer program product (for example, downloadable app) is stored at least temporarily on a machine-readable storage medium, such as a server of a manufacturer, a server of an application store, or a memory of a relay server, or may be temporarily generated.

What is claimed is:

1. A stereoscopic image display device comprising:

a display;

at least one processor; and memory storing instructions that, when executed by the at least one processor, cause the at least one processor to:

obtain a depth map from a planar image;

obtain feature information related to a first depth from the depth map;

obtain context information of the planar image;

calculate an estimated visual comfort (VC) of a user for viewing a first stereoscopic image, based on the depth map, the feature information, and the context information;

generate a corrected depth map, based on the estimated VC and a target VC;

generate a left-eye image by correcting the planar image, based on the corrected depth map;

generate a right-eye image by warping the left-eye image; and output, to the display, the left-eye image and the right-eye image to display a second stereoscopic image, wherein the feature information comprises a plurality of weighting values contributing to the estimated VC according to a first plurality of depths of a plurality of pixels included in the planar image.

2. The stereoscopic image display device of claim 1, wherein the feature information comprises depth information indicating a second plurality of depths of a plurality of regions of the planar image and a confidence value obtained by estimating an error degree of the second plurality of depths.

3. The stereoscopic image display device of claim 1, wherein the context information comprises an object included in the planar image, a relative size of the object, and a position of the object.

4. The stereoscopic image display device of claim 1, wherein the context information comprises motion information related to a motion of the planar image and edge information to correct the estimated VC based on an error in a second depth of the planar image.

5. The stereoscopic image display device of claim 1, wherein the at least one processor is configured to execute the instructions to cause the stereoscopic image display device to:

obtain uncertainty information related to uncertainty of the depth map; and generate the corrected depth map, based on the uncertainty information.

6. The stereoscopic image display device of claim 1, wherein the at least one processor is configured to execute the instructions to cause the stereoscopic image display device to obtain loss information related to a disparity between the planar image and the left-eye image.

7. The stereoscopic image display device of claim 1, wherein the at least one processor is configured to execute the instructions to cause the stereoscopic image display device to reduce a three-dimensional effect of a threshold region with a second depth greater than or equal to a threshold depth in the depth map.

8. The stereoscopic image display device of claim 1, wherein the at least one processor is configured to execute the instructions to cause the stereoscopic image display device to:

extract a region of interest from the planar image, based on a result of tracking a gaze of the user; and obtain the feature information, based on the depth map and the region of interest.

9. The stereoscopic image display device of claim 8, wherein the at least one processor is configured to execute the instructions to cause the stereoscopic image display device to correct a color of the region of interest, based on the depth map and the region of interest.

10. A method of controlling a stereoscopic image display device, comprising:

obtaining a depth map from a planar image;

obtaining feature information related to a first depth from the depth map;

obtaining context information of the planar image;

calculating an estimated visual comfort (VC) of a user for viewing a first stereoscopic image, based on the depth map, the feature information, and the context information;

generate a corrected depth map, based on the estimated VC and a target VC;

generating a left-eye image by correcting the planar image, based on the corrected depth map;

generating a right-eye image by warping the left-eye image; and outputting the left-eye image and the right-eye image to display a second stereoscopic image, wherein the feature information comprises a plurality of weighting values contributing to the estimated VC according to a first plurality of depths of a plurality of pixels included in the planar image.

11. The method of claim 10, wherein the feature information comprises depth information indicating a second plurality of depths of a plurality of regions of the planar image and a confidence value obtained by estimating an error degree of the second plurality of depths.

12. The method of claim 10, wherein the context information comprises an object included in the planar image, a relative size of the object, and a position of the object.

13. The method of claim 10, wherein the context information comprises motion information related to a motion of the planar image and edge information to correct the VC based on an error in a second depth of the planar image.

14. The method of claim 10, further comprising obtaining uncertainty information related to uncertainty of the depth map, wherein the generating the corrected depth map comprises correcting the depth map based on the uncertainty information.

15. The method of claim 10, further comprising obtaining loss information related to a disparity between the planar image and the left-eye image.

16. The method of claim 10, further comprising reducing a three-dimensional effect of a threshold region with a second depth greater than or equal to a threshold depth in the depth map.

17. The method of claim 10, further comprising extracting a region of interest from the planar image, based on a result of tracking a user's gaze, wherein the obtaining the feature information comprises obtaining the feature information based on the depth map and the region of interest.

18. The method of claim 17, further comprising correcting a color of the region of interest, based on the depth map and the region of interest.

* * * * *